United States Patent [19]

Nahir et al.

[11] Patent Number: 5,178,057
[45] Date of Patent: Jan. 12, 1993

[54] APPARATUS FOR REMOVING PULP FROM FRUIT

[75] Inventors: David Nahir, Bat Yam; Binyamin Ronen, Ra'anana, both of Israel

[73] Assignee: State of Israel-Ministry of Agriculture, Bet Dagan, Israel

[21] Appl. No.: 834,479

[22] Filed: Feb. 12, 1992

Related U.S. Application Data

[63] Continuation of Ser. No. 489,807, Mar. 5, 1990, Pat. No. 5,088,393.

[30] Foreign Application Priority Data

Mar. 9, 1989 [IL] Israel .................................. 89560

[51] Int. Cl.$^5$ .......................... A23N 4/00; A23N 4/24
[52] U.S. Cl. ......................................... 99/516; 99/584
[58] Field of Search ................ 99/485, 486, 495, 496, 99/514, 516, 534, 536, 538, 542–545, 547, 552, 555, 562, 563, 567, 584; 426/482, 481, 484, 485

[56] References Cited

U.S. PATENT DOCUMENTS

| | | | |
|---|---|---|---|
| 1,982,741 | 12/1934 | Keenan | 99/584 |
| 3,566,941 | 3/1971 | Morikawa | 99/516 |
| 4,294,861 | 10/1981 | Ifuku et al. | 99/584 |
| 4,300,448 | 11/1981 | Hayashi et al. | 99/537 |
| 4,421,021 | 12/1983 | Holbrook | 99/504 |
| 4,479,424 | 10/1984 | Carroll | 99/504 |
| 4,885,182 | 12/1989 | Kolodesh et al. | 426/482 |
| 4,889,046 | 12/1989 | Cornelissen | 99/516 |
| 4,957,043 | 9/1990 | Silvestrini et al. | 99/510 |
| 4,998,465 | 3/1991 | Fischer et al. | 99/584 |
| 5,088,393 | 2/1992 | Nahir et al. | 99/584 |

FOREIGN PATENT DOCUMENTS 2126964  6/1987  Japan ..................................... 99/516

*Primary Examiner*—Timothy F. Simone
*Attorney, Agent, or Firm*—Darby & Darby

[57] ABSTRACT

Apparatus for removing pulp from a fruit which has been cut so as to expose a portion of the fruit pulp surrounded by an exposed area of peel including apparatus for mounting the fruit, apparatus arranged in spaced relation to the apparatus for mounting for directing one or more jets of gas onto the exposed portion of pulp so as to separate it from the remainder of the fruit, and apparatus for substantially preventing impingement of the one or more jets of gas on the exposed area of peel.

2 Claims, 8 Drawing Sheets

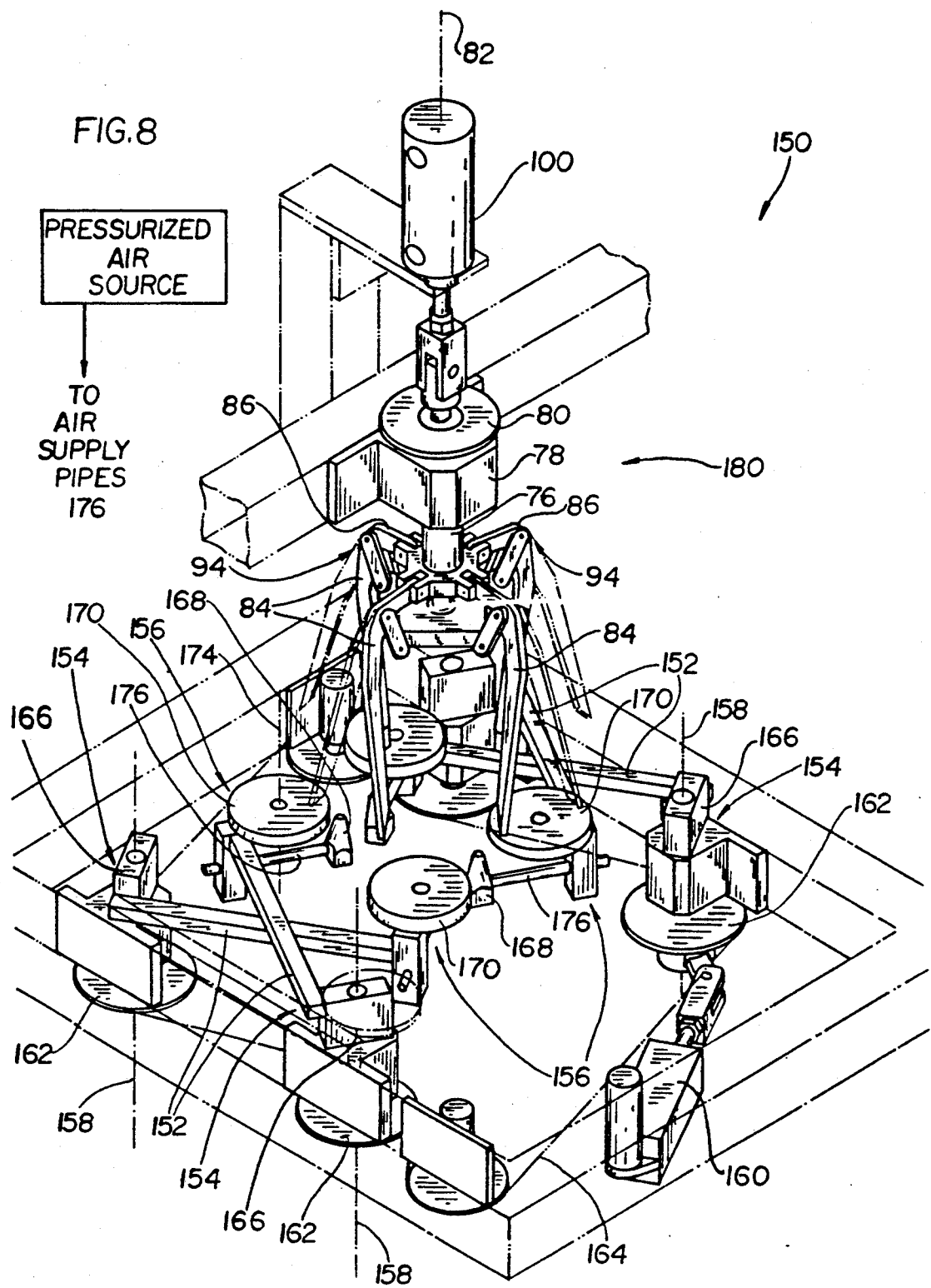

APPARATUS FOR REMOVING PULP FROM FRUIT

This is a continuation, of application Ser. No. 489,807, filed Mar. 5, 1990, U.S. Pat. No. 5,088,393.

FIELD OF THE INVENTION

The present invention relates generally to apparatus for processing citrus fruits and particularly to apparatus for removing pulp from fruit.

BACKGROUND OF THE INVENTION

There is a growing market demand for individual juice sacs of which the citrus fruit pulp is composed. The juice sacs are useful, inter alia, as additives to fruit juices and jams and may also be used as a convenience product, supply of the juice sacs obviating the necessity of a consumer having to peel the fruit in order to eat it.

In the case of pomellos grown in Israel, it has been found that as much as 35–40% of the annual crop may be unsuitable for marketing as fresh fruit. Moreover, pomellos are not sufficiently juicy for their juice to be extracted in commercially viable quantities and their peel is too tough to permit their use as animal fodder.

It would be useful, therefore, to be able to remove the juice sacs of which the fleshy part of the fruit is composed, so as to satisfy a growing demand therefor.

Described in U.S. Pat. No. 4,300,448 to Hayashi et al is apparatus for extracting pulp from citrus fruit, particularly mandarin oranges and tangerines. The apparatus employs a rotating pair of jets which cause a stream of pressurized fluid to impinge upon the interior of the fruit. The apparatus thus has only a single degree of rotational freedom, i.e., the jets rotate about a fixed axis.

The external configuration of a cut surface of a citrus fruit is generally irregular. The apparatus of Hayashi et al takes no account of this, and provides no means for ensuring that the streams of pressurized fluid impinge only on the fleshy interior of the fruit.

Disclosed in U.S. Pat. No. 4,530,278 to Sarig et al is apparatus for mechanical separation of the seeds of pomegranates or similar produce including a gas jet directed on the portion of the produce to be separated for effecting the separation desired. The gas jet is operative to scan an exposed interior portion of the pomegranate so as to cause separation of the seeds of that portion. The scanning is effected, however, without regard to the external configuration of the fruit.

In the area of extracting juice from fruit, particularly citrus fruits, the extraction is most commonly achieved by crushing the fruit and thereafter draining the juice from the remainder of the fruit.

Among disadvantages of crushing fruit so as to obtain its juice, is that when the whole fruit is crushed, liquids are released not only from the fruit pulp, but also from the fruit peel, which particularly with citrus fruits, tends to be bitter tasting. A further disadvantage is that, in general, not all of the fruit juice is extracted by crushing the fruit.

The hereinbelow listed patents are representative of art pertaining to the area of fruit pulp extraction in general, and, in particular, to the extraction of the juice sacs and/or of the fruit juice. The patents are as follows:

U.S. Pat. Nos. 1,982,742; 3,518,093; 3,976,001; 4,078,481; 4,106,401; 4,125,064; 4,157,062; 4,183,293; 4,228,732; 4,301,719; 4,309,942; 4,309,943; 4,345,517; 4,350,087; 4,363,265; 4,376,409; 4,378,730; 4,393,760; 4,414,886; 4,421,021; 4,429,626; 4,440,074; 4,586,430; 4,614,153; 4,640,186; and 4,479,424; and Israel Patents Nos. 17,138; 20,296; 22,409; 23,226; 23,237; 26,735; 27,544; 33,451; 44,719; 41,390; 42,715; 43,867; 45,151; 55,761; 55,852; 62,032; 64,762; 66,563; and 67,026.

SUMMARY OF THE INVENTION

It is an aim of the present invention to provide apparatus for and a method of removing the pulp from citrus and other fruits so as to overcome disadvantages of known art.

There is provided, therefore, in accordance with an embodiment of the invention, apparatus for removing pulp from a fruit which has been cut so as to expose a portion of the fruit pulp surrounded by an exposed area of peel including apparatus for mounting the fruit, apparatus arranged in spaced relation to the apparatus for mounting for directing one or more jets of gas onto the exposed portion of pulp so as to separate it from the remainder of the fruit, and apparatus for substantially preventing impingement of the one or more jets of gas on the exposed area of peel.

Additionally in accordance with an embodiment of the invention, there is also provided apparatus for causing relative rotation between the fruit and the apparatus for directing, and the apparatus for preventing impingement includes apparatus for correlating the relative rotation with the shape of the fruit.

Further in accordance with an embodiment of the invention, the apparatus for correlating includes apparatus, associated with the apparatus for directing, for engaging the exterior of the fruit at a predetermined distance from the one or more jets of gas, the predetermined distance being related to the thickness of the peel.

There is also provided, in accordance with an additional embodiment of the invention, a method of removing pulp from a fruit which has been cut so as to expose a portion of the fruit pulp surrounded by an exposed area of peel including the step of directing one or more pressurized jets of gas onto the exposed portion of pulp so as to separate it from the remainder of the fruit while substantially preventing impingement of the one or more pressurized jets of gas on the exposed area of peel.

Additionally in accordance with the invention, the method includes the step of causing relative rotation between the fruit and the one or more pressurized jets of gas, the step of directing while substantially preventing impingement including the step of correlating the relative rotation with the shape of the fruit.

BRIEF DESCRIPTION OF THE DRAWINGS

The present invention will be understood and appreciated more fully from the following detailed description, taken in conjunction with the drawings, in which:

FIG. 8 is a perspective view illustration of a gripping and gas jet assembly, constructed and operative in accordance with an alternative embodiment of the present invention;

DETAILED DESCRIPTION OF THE INVENTION

Figure 1:
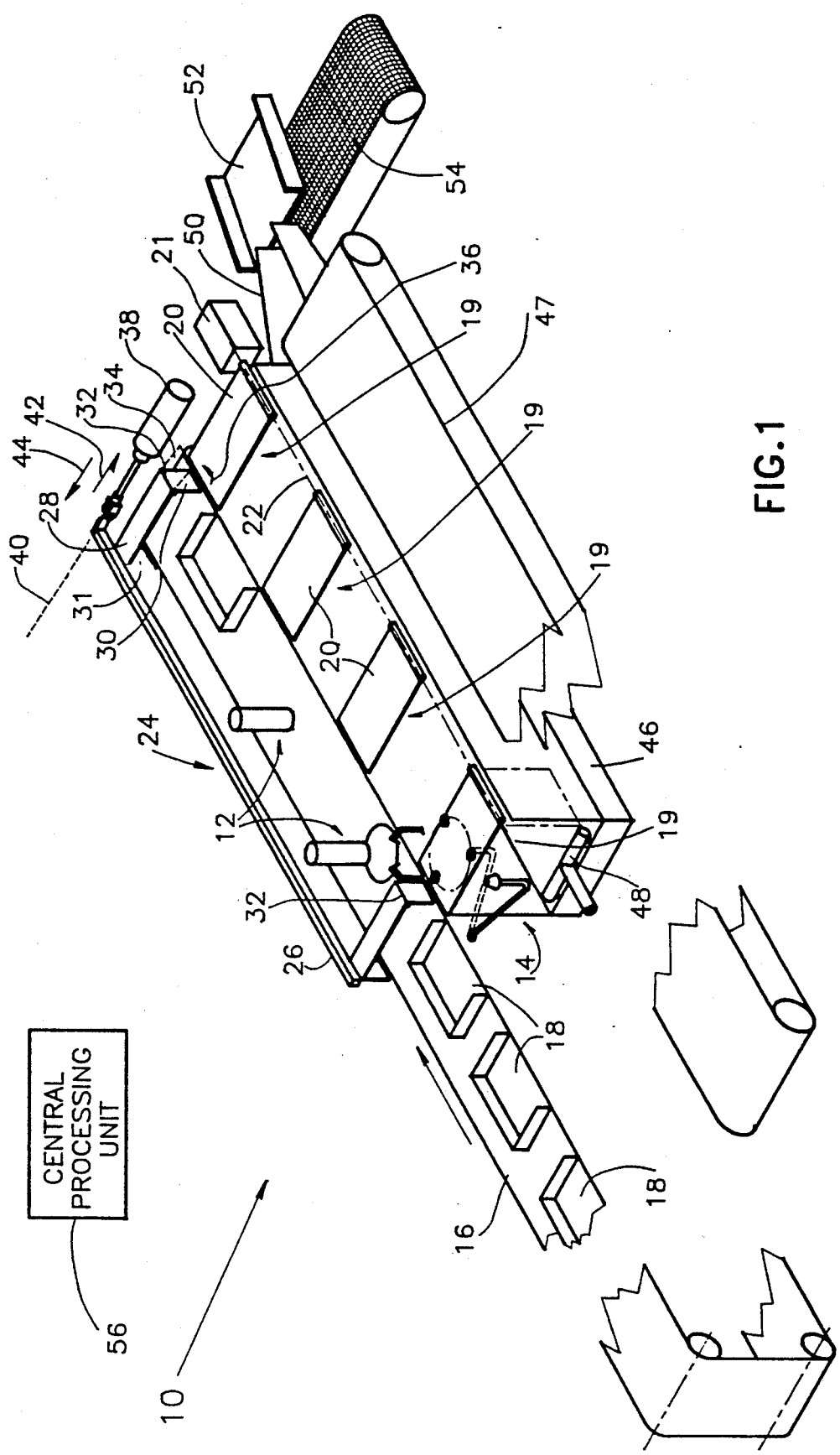
FIG. 1 is a schematic perspective illustration of apparatus for removing pulp from fruit, constructed and operative in accordance with the present invention.

Referring to FIG. 1, there is shown apparatus, referenced generally 10, for removing pulp from fruit, constructed and operative according to a preferred embodiment of the invention. The apparatus is particularly suitable for removing the pulp of citrus fruit such as pomellos and grapefruits, but it may also be used with other varieties of citrus fruit, such as oranges and lemons. The apparatus may also be used with certain non-citrus fruits, such as pomegranates.

Apparatus 10 comprises apparatus 12 for gripping and axially rotating a portion, preferably half, of a fruit, such that a surface thereof at which are exposed pulp and peel, faces generally downwards. There is also provided apparatus 14 for selectably directing jets of pressurized gas at the downwardfacing exposed surface of the fruit. As described below in detail, direction of jets of pressurized gas at a fruit is operative to cause separation of the pulp from the remainder of the fruit.

As will be appreciated by persons skilled in the art, and as described in detail hereinbelow, the jets of gas may be provided at a relatively low pressure so that the pulp is removed in the form of nominally 'whole' juice sacs from the peel, as described and defined hereinbelow. Alternatively, the jets of gas may be provided at a relatively high pressure, so that the pulp removed from the fruit includes a large number of juice sacs that have burst so as to discharge their juice.

In general, apparatus 10 also includes a feed conveyor 16 which, according to the shown embodiment, defines a plurality of fruit transport locations 18, which are configured to hold a single half of a fruit. The feed conveyor 16 is arranged to convey the fruit to positions adjacent to a plurality of pulp removal locations 19. Located at each pulp removal location is apparatus 12 for gripping and rotating the fruit and apparatus 14 for directing jets of pressurized gas at the fruit.

At each pulp removal location 19 there is provided a door 20 which is rotatable about an axis 22, preferably by means of a motor, such as a hydraulic motor, shown schematically at 21. In a first position, door 20 is generally parallel to an adjacent portion of conveyor 16 but has a slightly lowered position in relation thereto, and constitutes a surface onto which the adjacent fruit half is transferred, exposed surface down, so as to permit engagement of the fruit by the apparatus 12 for gripping and rotating the fruit, as described below in detail in conjunction with FIG. 3.

In a second position, as shown in broken lines, door 20 has an orientation substantially at right angles to the first position. As will be appreciated, door 20 is rotated from the first position to the second position only once the fruit has been engaged by apparatus 12.

A mechanical pusher 24 is provided to push individual portions of fruit from transport locations 18 to adjacent pulp removal locations 19. Although pusher 24 may be any suitable apparatus, according to the shown embodiment it comprises a frame 26 arranged over feed conveyor 16 and comprising a plurality of transversely extending rigid arms 28. A single arm 28 is provided in association with each of the pulp removal locations, although, for clarity, not all of the arms 28 are illustrated. Each arm 28 has suspended therefrom respective front and back flaps 30 and 31. Each front flap 30 is mounted for rotation about a hinge 32, between the illustrated full line position and the illustrated broken line position, shown at reference numeral 34. Back flaps 31 are mounted in a similar manner.

Each flap may be rotated in a direction opposite to that indicated by arrow 36 only as far as the illustrated full line position. Therefore, when pusher 24 is in a generally disengaged position (not shown), when it is sought to transfer a fruit from a transport location 18 to an adjacent pulp removal location 19, while at the same time removing therefrom an empty fruit peel, apparatus 38 is operative to move pusher 24 along axis 40, in the direction shown by arrow 42. The described movement of the pusher 24 along the axis 40 causes each back flap 31 to engage and thus push a fruit from a corresponding transport location 18 of the feed conveyor to a corresponding pulp removal location 19. At the same time, front flap 30 is operative to engage an empty fruit peel, from which the pulp has been removed and which is located on one of doors 20, and to push the fruit peel onto a waste conveyor 47.

Apparatus 38 is thereafter operative to return pusher 24 in the opposite direction along axis 40, as shown by arrow 44, to a disengaged position. In the event that a fruit has already been moved into a transport position 18 adjacent to a pulp removal location 19 prior to pusher 24 being moved back, as pusher 24 is subsequently moved back, a back flap 31 engaging the fruit is operative simply to slide thereover.

Apparatus 38 may be any suitable apparatus for moving pusher 24 reciprocally along axis 40. According to the shown embodiment, however, apparatus 40 is a bidirectional hydraulic assembly.

A sloping trough 46 extends beneath pulp removal locations 19 and is arranged to receive removed fruit pulp falling by gravity.

When the apparatus is used for removing fruit pulp primarily in the form of whole juice sacs, a water supply 48 provided at the upper end of the sloping trough is used to maintain at least a predetermined minimum depth of water in the trough. According to the illustrated configuration, the depth of water is greatest at the lower end 50 of the trough.

Therefore, as the juice sacs falling into the trough are carried towards the lower end thereof, any fruit seeds that may be present in the flow float to the top and are discharged to a seed reception member 52. The fruit sacs, however, having sunk to the bottom of the flow, are discharged onto a sieving conveyor 54.

When, however, the apparatus is used for removing fruit pulp of which a large proportion is in the form of 'released' juice, water is only supplied to the trough between pulp removing operations, for purposes of cleaning.

Although operation of apparatus 10 may be carried out manually maximum efficiency is achieved, however, by use of an electronic central processing unit 56 for synchronizing the various operations of apparatus 10. An example of a suitable unit is model No. VSD 1500-1, manufactured by SOLCON INDUSTRIES LTD., of 37, Derech Petah Tiqva, Tel Aviv, Israel.

Figure 2:
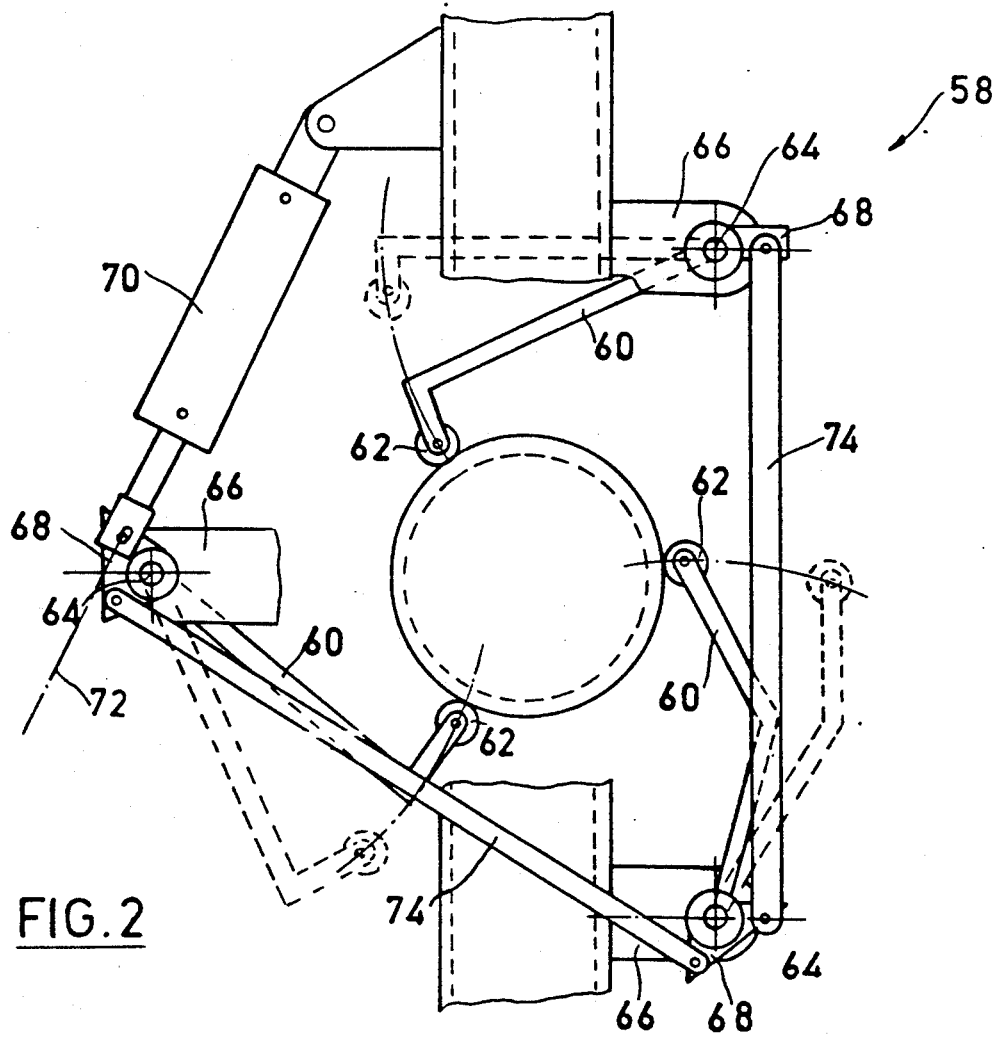
FIG. 2 is a schematic plan view illustration of apparatus, constructed in accordance with an embodiment of the invention, for centering a portion of a fruit relative to a rotation axis defined by apparatus for gripping and rotating, forming part of the apparatus of FIG. 1.

Reference is now made to FIG. 2, which is a schematic plan view illustration of apparatus, referenced generally 58, for centering a portion of fruit once it has been transferred onto a door 20 (FIG. 1) in its first position, and prior to the fruit being engaged by apparatus 12 (FIG. 3) for gripping and rotating. As apparatus 12 is operative to axially rotate a portion of fruit, as described hereinbelow with respect to FIG. 3, it is desirable that the portion of fruit should be brought into axial alignment with the axis of rotation (FIG. 3) prior to being engaged by apparatus 12.

Accordingly, centering apparatus 58 comprises a plurality of arms 60, having rollers 62 at the free ends thereof, each arm being mounted for rotation about an axis 64 extending through a fixed support 66. An end element 68 is rigidly mounted onto each arm distally from its free end, such that rotational movement of the end element about axis 64 is operative to cause a similar rotation of the arm about axis 64. According to the shown embodiment, one of the arms 60 is connected, via its element, to a hydraulic assembly 70 which is operative to apply a displacement force to an associated end element 68, generally along an axis 72. Elongate members 74 are connected between the arms 60, via their respective end elements 68, so as to transmit the motion of the hydraulic assembly to all of the arms equally.

Rotation of arms 60 as illustrated is operative to gently move the portion of fruit towards axial alignment with the axis (FIG. 3) of the gripping and rotating apparatus 12. When not in operation, hydraulic assembly 70 is retracted so as to move arms 60 into the positions shown by broken lines.

Figure 3:
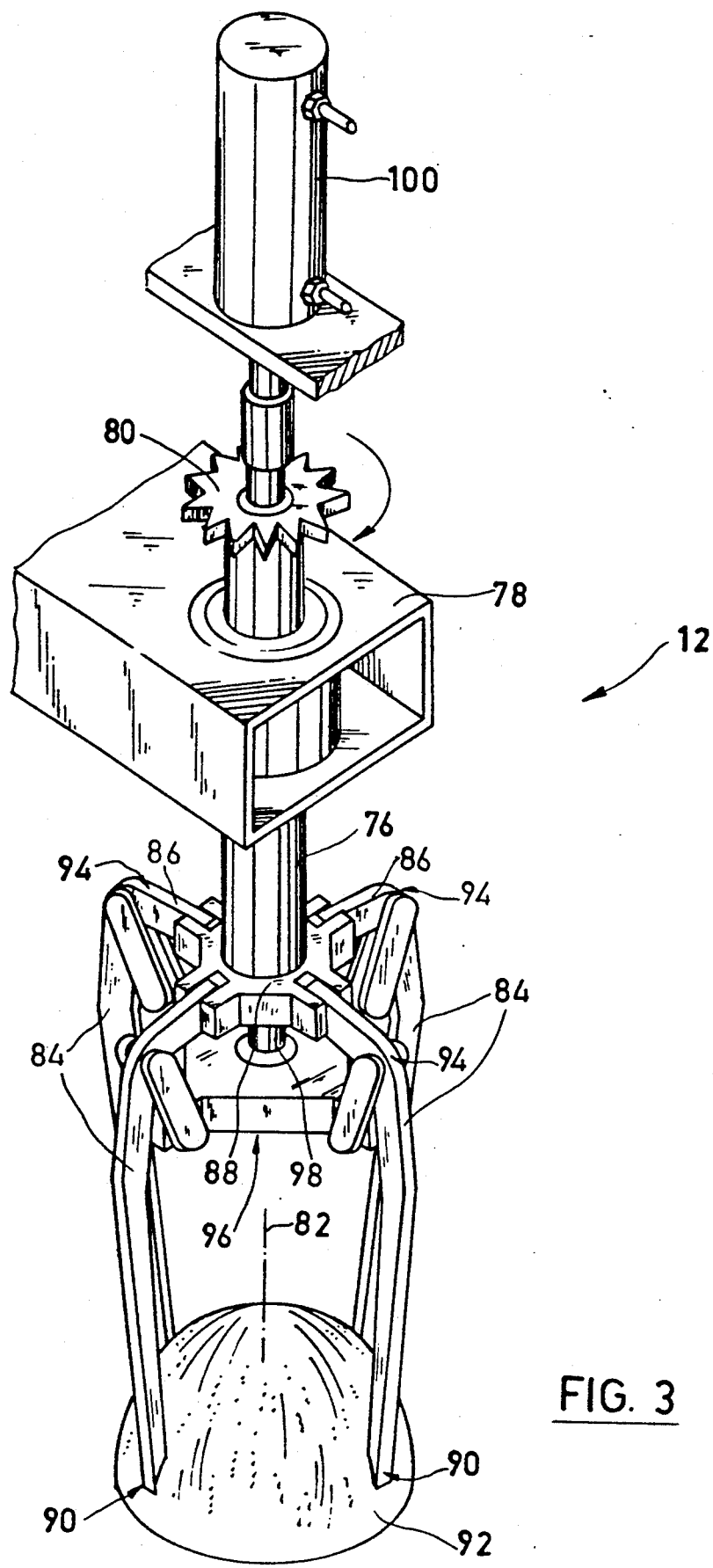
FIG. 3 is a schematic perspective illustration of apparatus for gripping and rotating a portion of a fruit that has been centered by the apparatus of FIG. 2.

Reference is now made to FIG. 3, which is a schematic perspective illustration of the apparatus 12 for gripping and rotating a portion of a fruit after it has been centered by apparatus 58 (FIG. 2). Apparatus 12, as shown, comprises a central shaft 76 mounted in a fixed member 78 and arranged to be rotated, as by means of a rotational force applied to a toothed wheel 80 mounted onto shaft 76, about an axis 82.

Apparatus 12 also includes a plurality of cranked gripper arms 84, each having a first end 86 hingedly attached to a fixed member 88 mounted onto a lower portion of shaft 76, and a second end 90, typically having a plurality of spikes (not shown) for engaging and gripping a portion of fruit, shown at 92, such that it may be rotated together with shaft 76.

Each gripper arm 84 is also attached at a hinge location 94 to an assembly 96, driven typically by an axially aligned drive shaft 98 mounted for reciprocating movement within shaft 76, so as to raise and lower gripper arms 84. Shaft 98 is driven typically by a bidirectional hydraulic assembly 100. It will be appreciated that although four gripper arms are shown, any other suitable number of arms may be used in alternative embodiments of the invention.

Figure 4:
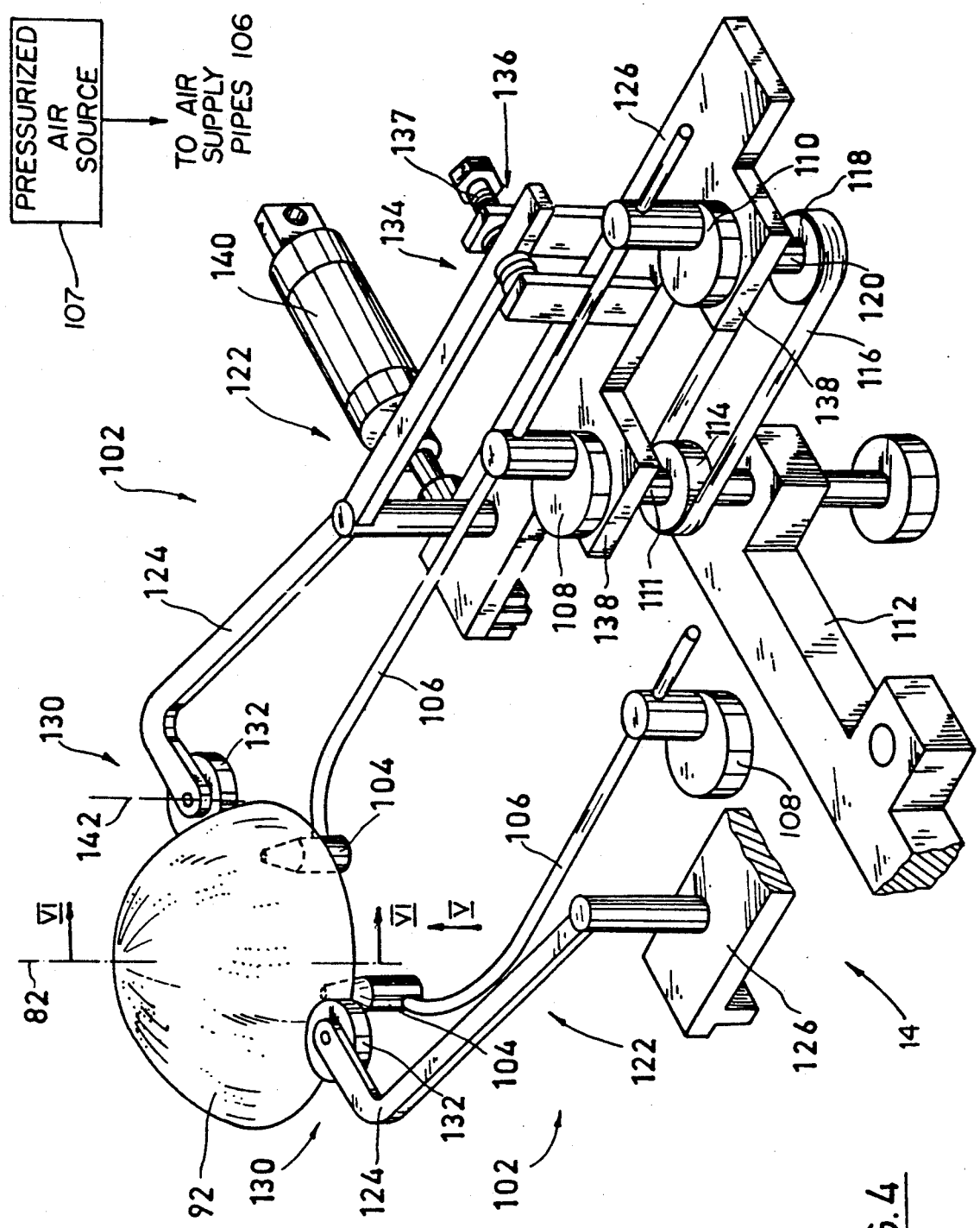
FIG. 4 is a schematic perspective illustration of apparatus for directing pressurized jets of gas at a portion of fruit being held and rotated by the apparatus of FIG. 3, and including apparatus for correlating a scanning motion of the gas nozzles with the shape of the portion of the fruit so as to retain direction of the gas jets towards the exposed pulp of the fruit.
Figure 5:
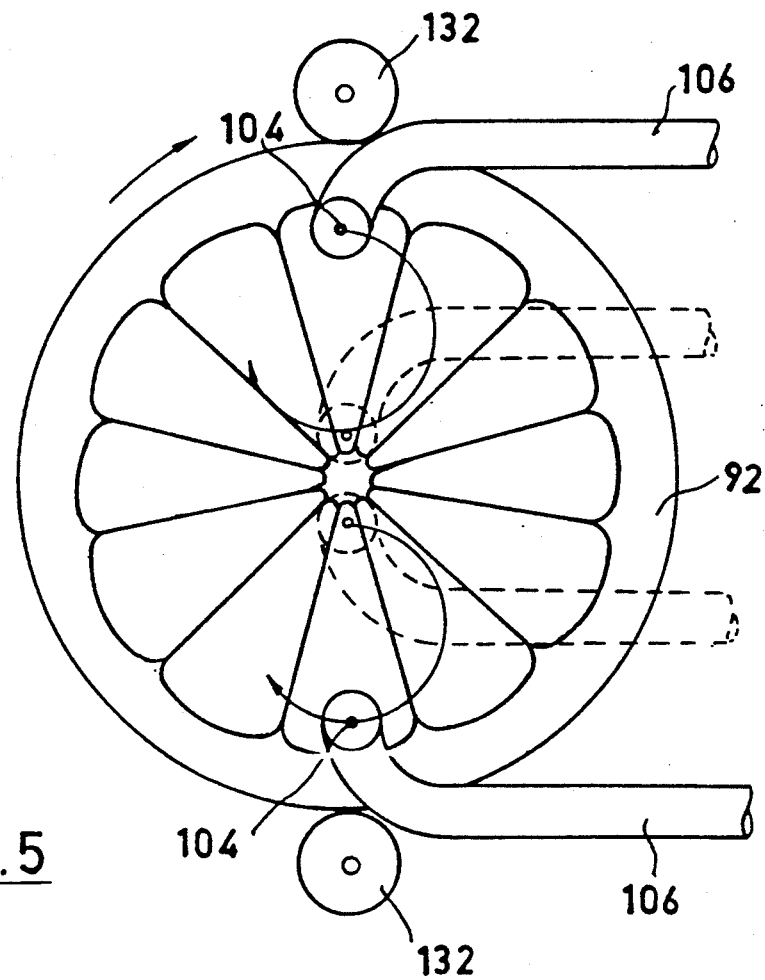
FIG. 5 is a view taken in the direction of arrow V in FIG. 4.

Reference is now made to FIG. 4, wherein there is illustrated apparatus 14 for directing pressurized jets of gas at a portion of fruit 92 being held and rotated by the apparatus 12 (FIG. 3), so as to separate fruit pulp from the remainder of the fruit.

Apparatus 14 comprises a pair of generally similar assemblies 102, each of which includes a pressurized air nozzle 104 mounted in communication with an air supply pipe 106. Pressurized air may be supplied from any suitable source, shown schematically at 107. As described hereinabove, the pressure at which air is supplied depends on the desired form of the removed pulp and on the type of fruit from which the pulp is to be removed.

When the apparatus is used for removing pulp having a large proportion of released juice, the air pressure needs to be higher than that required when the aim is to remove whole juice sacs. Furthermore, removal of pulp from relatively tough fruit, such as pomellos, requires use of a higher air pressure than that required for relatively soft fruit, such as grapefruits, oranges and lemons. Accordingly, the highest pressures will be required for removing pulp having a large proportion of released juice from relatively tough fruit, while the lowest pressures will be required for removing whole juice sacs from relatively soft fruit.

The inventors have found that air supplied at a pressure of about 6-7 atmospheres is operative to cause separation of whole juice sacs from pomellos. In order to receive whole juice sacs from softer fruits, such as grapefruits and oranges, however, air should be supplied at a relatively low pressure of about 2.5-3 atmospheres. For removal of pulp of which a large proportion of the juice sacs have burst, higher working pressures are required.

Figure 6:
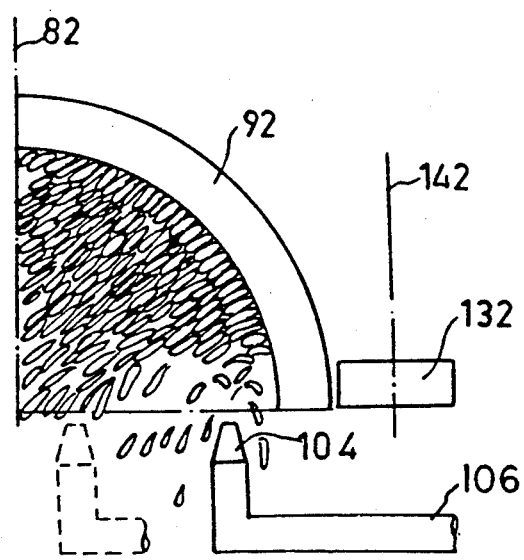
FIG. 6 is a partially cut-away view taken along line VI—VI in schematic in FIG. 4.

As shown schematically in FIG. 6, the air jet delivered by nozzle 104 is effective to sever the 'tail' by which each juice sac is secured to a membrane which normally separates the juice sacs from the pith of the fruit. Once the tail of a juice sac has been severed, it falls by gravity towards the trough 46 (FIG. 1). The pressure of the impinging air jet may be sufficiently high so as to sever the tail of a juice sac, while not so high as to cause the juice sac to burst, thereby resulting in the severance of nominally whole juice sacs.

Alternatively, the air pressure may be set so as to cause not only severance of tail of the juice sac from the pith, but also to cause the juice sac to burst, thereby resulting in the release of the juice hitherto contained by the juice sacs. It will be appreciated that this method of extracting fruit juice has several advantages over those conventional juice extraction methods involving the squeezing of the fruit.

Among the advantages of the present invention is that substantially all of the fruit pulp, which is ultimately convertible into juice, is removed from the fruit. Additionally, the liquid obtained is only that formerly contained by the juice sacs, and does not include oils and other elements contained by the fruit peel.

Each pipe 106 is eccentrically mounted, as illustrated, onto first and second similar driven wheels, referenced 108 and 110 respectively. First driven wheel 108 is mounted for rotation onto a first drive shaft 111, parallel to axis 82 and extending through and supported by a member 112. A third driven wheel 114 is mounted onto drive shaft 111 and, via a drive belt 116, is operative to drive a fourth driven wheel 118, mounted onto a second drive shaft 120, parallel to the first drive shaft and onto which second driven wheel 110 is also mounted. Rotation of the drive wheels produces, therefore, a rotational movement of air nozzle 104 between the full and broken line positions illustrated in FIG. 6.

Associated with each assembly 102 is apparatus 122 for correlating the rotational movement of nozzle 104 with the external shape of the portion of fruit in a plane defined by the exposed surface of the portion of fruit. Apparatus 122 comprises an arm 124 mounted onto a transmitting member 126 aligned substantially parallel to axis 82. At a first end 130 of arm 124, there is provided a roller 132 arranged for travel along the exterior of the portion of fruit 92 in a plane substantially perpendicular to axis 82.

A second end 134 of arm 124 is retained by means of an adjustable screw assembly 136 mounted onto transmitting member 126. Transmitting member 126 defines portions 138 through which the first and second drive shafts 111 and 120 extend, such that a lateral movement of member 126, such as may be caused by a surface indentation or protrusion on the exterior of the fruit, is operative to move air pipe 106 and therefore nozzle 104 by a similar distance. There is also provided apparatus 140 for bringing roller 132 into contact with the exterior of the fruit, and which is operative to ensure that the contact is maintained. Typically, apparatus 140 is a bidirectional pneumatic assembly.

The adjustable screw assembly 136 is operative to maintain a predetermined minimum distance between the axis 142 of roller 132 and the nozzle 104. This minimum distance, which may be changed by altering screw 137 in assembly 136, is set to correspond to the thickness of the peel of the fruit, which is assumed to be substantially uniform within a given fruit and within a given size of fruit of a given type of fruit.

Figure 7:
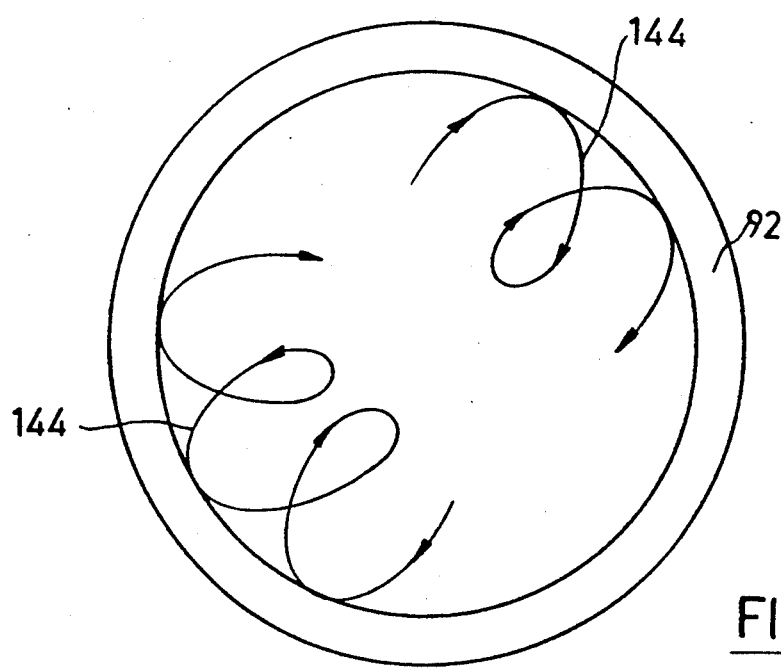
FIG. 7 is a diagrammatic view of the scanning pattern of the gas jets of FIG. 4 resulting from the rotation of a portion of fruit by the apparatus shown in FIG. 2 and a reciprocating motion of the gas nozzles shown in FIG. 4.

Referring now to FIG. 7, it will be appreciated that the rotation of the portion of fruit 92 produced by gripping and rotating apparatus 12, when taken together with the rotational motion of each of the air nozzles 104, produces a scanning motion in the form of a series of loops, as shown at 144. According to the present embodiment, each portion of fruit is rotated by just over half a rotation, so that each nozzle scans half of the exposed portion of the fruit. According to alternative embodiments, however, any preferred number of nozzles may be provided and the fruit may be rotated through any preferred number of rotations.

Figure 9A:
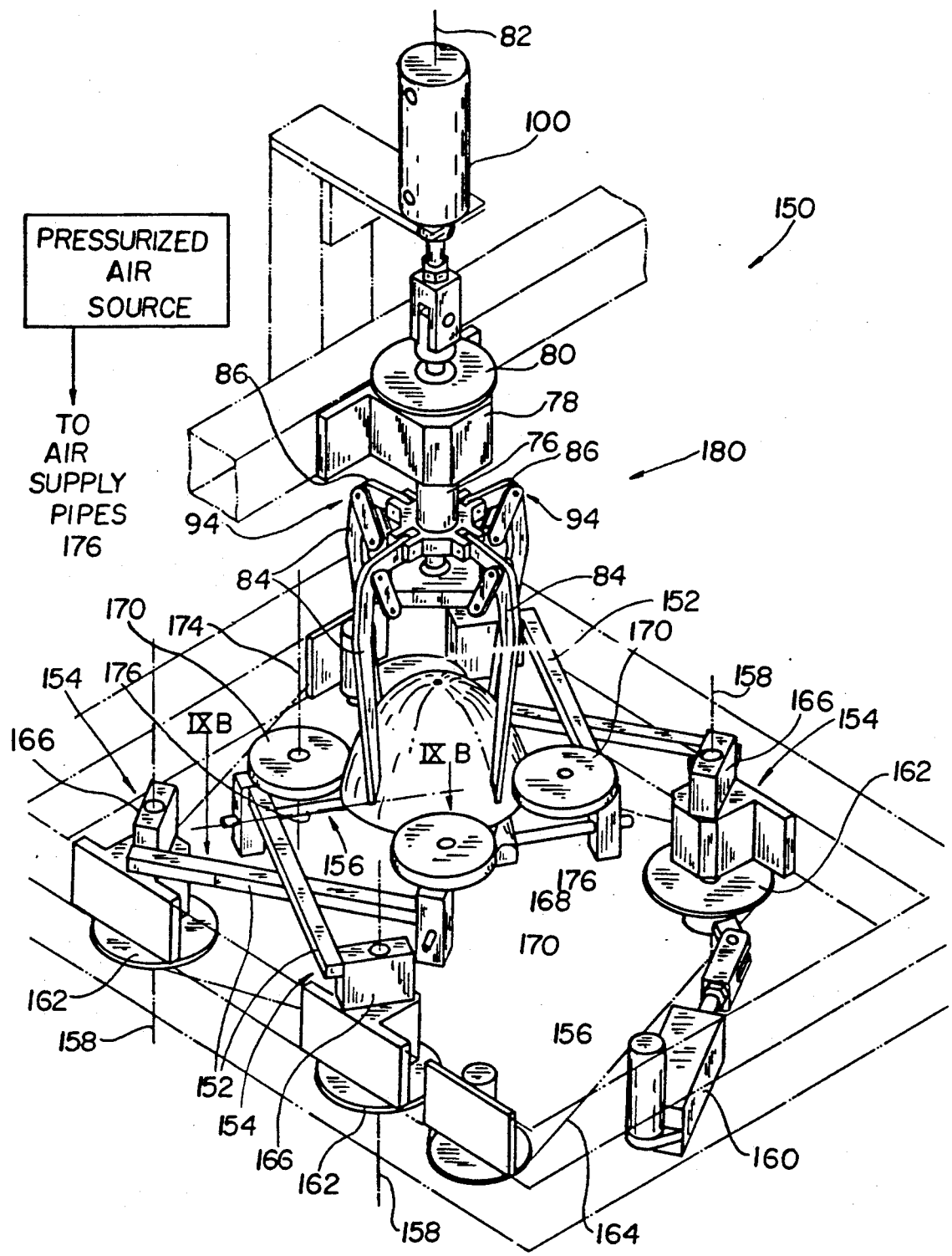
FIG. 9B is a detailed illustration of a portion of the assembly of FIG. 9A, taken in the direction of lines VIIIB—VIIIB therein.

Reference is now made to FIGS. 8 and 9A, illustrating an assembly 150 for gripping a portion of fruit and for directing jets of a pressurized gas at a fruit, according to an alternative embodiment of the invention.

According to the present embodiment, assembly 150 includes a plurality of arms 152, having first and second ends, respectively referenced 154 and 156. Four arms 152 are provided in the present embodiment. Each arm 152 is mounted at its first end 154 for rotation about an axis 158, as by the schematically illustrated bidirectional hydraulic motor 160 and its associated transmission assembly, which comprises a plurality of driven wheels 162 interconnected via a drive belt 164. Each arm 152 is rotated about its associated axis 158 via a mounting element 166 attached to an associated drive wheel 162.

Figure 9B:
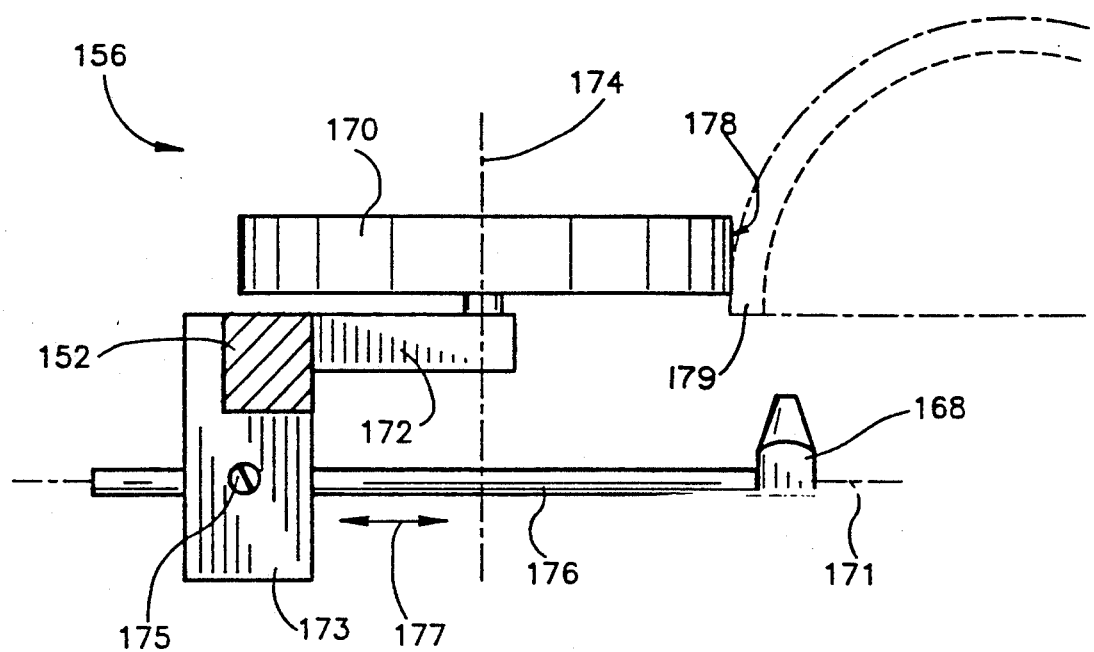

Referring additionally to FIG. 9B, mounted in association with the second end 156 of each arm 152 is an adjustable, pressurized gas nozzle 168 and a fruit engagement roller 170. According to the present embodiment, each roller 170 is mounted onto arm 152 via a support member 172 (FIG. 9B) mounted onto an end member 173, for rotation about an axis 174.

Each nozzle 168 is mounted onto second end 156 of an arm 152 via a rigid gas supply tube 176. Tube 176 extends through end member 173 and, as indicated by double-headed arrow 177, the tube may be moved along its longitudinal axis 171 so as to position the nozzle 168 at a selected distance from the roller 170. Typically a screw 175 is provided to lock the tube 176 in position.

As illustrated, the perpendicular distance of nozzle 168 from its associated arm 152 and, therefore, from its associated fruit engagement roller 170, is set such that the distance between the edge 178 (FIG. 9B) of the roller 170 and the gas nozzle 168 is related to the thickness of the peel 179 of the fruit whose pulp is being removed. The retention of each arm 152 in contact with the fruit exterior may be provided, for example, by means of a spring mechanism (not shown) associated with mounting element 166 (FIGS. 8 and 9A).

It will thus be appreciated that the fruit engagement roller is operative to follow the external configuration of the fruit so as to ensure that the jets of pressurized gas are directed at the fruit pulp and not at the peel. In contrast to the embodiment of FIG. 4, the gas nozzles of the present embodiment are not rotatable. Typically, although not necessarily, the pressurized gas supplied via the nozzles 168 is air.

Assembly 150 also includes apparatus 180 for gripping and rotating a portion of a fruit once it has been placed in an associated pulp removal location. The apparatus 180 is similar to apparatus 12 shown and described above in conjunction with FIG. 3 and is, therefore, not specifically described herein. Components of apparatus 180 are denoted by the reference numerals used in FIG. 4 to denote similar components.

In operation, therefore, prior to the positioning of a portion of fruit on a door 20 (FIG. 1) at a pulp removal location 19 (FIG. 1), gripping apparatus 180 is in a generally raised position and arms 152 are in a generally retracted position as illustrated in broken lines, referenced 182, in FIG. 9A.

Prior to door 20 being lowered, as described hereinabove, arms 84 of gripping apparatus 180 are lowered so as to engage a portion of fruit positioned on the door 20 (FIG. 1). According to one embodiment, the pressure used to grip the fruit may be set according to the toughness of the fruit peel and of the fruit in general.

Once the fruit has been engaged, as illustrated in FIG. 8, motor 160 is operated so as to rotate arms 152 from their generally retracted positions, indicated by broken lines, to a fruit engagement position, whereby rollers 170 engage the exterior of the fruit. The portion of fruit is rotated by the gripping apparatus about axis 82 and as arms 152 are retained in contact with the fruit exterior, regardless of irregularities in the surface configuration of the fruit, the jets of pressurized air also remain directed at the fruit pulp, and are thus prevented from impinging on the peel.

As described above, the fruit pulp is separated from the peel as the tail of each juice sac is severed by an impinging jet of air and, depending on the air pressure, the pulp is thus removed from the fruit either with a high proportion of burst juice sacs, or as whole juice sacs.

The inventors have found that when operating pulp removal apparatus constructed in accordance with the embodiment of FIGS. 8A–9, for the removal of grapefruit pulp, the results contained in the following table were obtained:

| Operating Air Pressure (Atm) | 3 | 4 | 5 | 6 | 6.5 |
|---|---|---|---|---|---|
| Percentage Total Yield | 38 | 51 | 56 | 57 | 58.5 |
| Juice Sacs as a Proportion of Yield | 65 | 62 | 68 | 64 | 67 |
| Percentage Whole Sacs | 18 | 18 | 21 | 15 | 15 |
| Juice as a Proportion of Yield | 35 | 38 | 32 | 36 | 43 | wherein $$\text{Percentage Total Yield} = \frac{\text{(weight of juice and juice sacs)}}{\text{(weight of the fruit)}} \times 100$$

$$\text{Juice Sacs as a Proportion of Yield} = \frac{\text{(weight of all juice sacs)}}{\text{(weight of yield)}} \times 100$$

$$\text{Percentage Whole Sacs} = \frac{\text{(weight of whole juice sacs)}}{\text{(weight of the fruit)}} \times 100$$

$$\text{Juice as a Proportion of Yield} = \frac{\text{(weight of strained juice)}}{\text{(weight of yield)}} \times 100$$

The above listed figures represent an appreciable improvement on the effectiveness of conventional methods of fruit juice extraction involving squeezing the fruit. A quantity of juice having a weight of approximately 40-50% of the overall weight of the fruit is obtainable by conventional fruit squeezing methods. In contrast to conventional methods, the percentage total yield as defined in conjunction with the above example, when operating apparatus of the present invention at air pressures in the range 5-6.5 atm, is in the range 56-58.5%. Although the actual juice that is directly obtained, as a proportion of the yield, is between 32-43%, in excess of 96% of the total yield is ultimately convertible into juice. It may be seen, therefore, that the amount of juice obtainable by use of the apparatus of the present invention may be 7.5-40% higher than that obtainable by conventional methods.

As described, the apparatus of the present invention may be used, according to one embodiment, to remove fruit pulp in the form of nominally whole juice sacs. The term "whole" is intended to indicate a certain minimum percentage of undamaged juice sacs and may be determined by testing a sample of juice sacs according to recognized quality testing criteria.

A typical quality test of a sample of juice sacs is that of color testing, whereby a random sample of 5 grams of juice sacs, from which liquids have been allowed to drain for two minutes, is submerged in 0.1% methylene-blue water solution for one minute. The juice sacs are then washed with water and placed into a white vessel and segregated according to three color categories, namely, completely colored sacs, 50% colored sacs and sacs of which only protruding portions are colored.

Completely colored sacs receive no points, 50% colored sacs receive 3 points and sacs of which only protruding portions are colored receive 5 points. A result is obtained by dividing the total number of points received by the maximum possible number of points for the sample and then multiplying by 100. A result of 100 signifies, therefore, a perfect sample, while a result of zero signifies a completely damaged sample. Throughout the present application, it is intended that when juice sacs are described herein as being "whole", this implies juice sacs within samples giving a result of 80 or more according to the above-described method of testing.

It will be appreciated by persons skilled in the art that the present invention is not limited to what has been shown and described hereinabove. The scope of the present invention is limited, rather, solely by the claims, which follow.

We claim:

1. Apparatus for removing pulp from fruit which has been cut so as to expose a portion of the fruit pulp surrounded by an exposed lip of peel comprising:
    means for directing at least one pressurized jet of gas onto the exposed portion of pulp so as to separate it from the remainder of the fruit;
    means for causing rotation of the fruit relative to said means for directing about an axis of relative rotation;
    means for substantially preventing impingement of said at least one jet of gas on the exposed lip of the peel and including means for engaging an exterior surface of the fruit and means for mounting at least one pressurized jet of gas at a predetermined distance from the means for engaging.

2. Apparatus according to claim 1 and wherein said means for engaging is operative to center the fruit about said axis of relative rotation.

* * * * *